United States Patent Office 3,413,077
Patented Nov. 26, 1968

3,413,077
PROCESS OF DYEING CELLULOSE AND POLY-
AMIDE FABRICS WITH REACTIVE DYESTUFFS
Mario Bertin, Ugo Moiso, Giulio Craia, and Aldo Pasquarelli, Milan, Italy, assignors to Aziende Colori Nazionali Affini ACNA S.p.A., Milan, Italy, a corporation of Italy
No Drawing. Continuation-in-part of application Ser. No. 313,451, Oct. 3, 1963. This application June 7, 1965, 462,072
2 Claims. (Cl. 8—54)

The instant application is a continuation-in-part application of Ser. No. 313,451, filed Oct. 3, 1963, now abandoned.

This invention is directed to a new class of reactive dyestuffs and more specifically to dyestuffs which are capable of forming chemical bonds with the fibers during the dyeing process. Thus, materials dyed with the compounds in accordance with the process of this invention have been found to be particularly stable to wet treatments.

Presently several classes of dyestuffs having the above-mentioned reactive groups are known. More specifically, some of these reactive dyestuffs are derived from cyanuric chloride and are characterized by the general formula:

I.

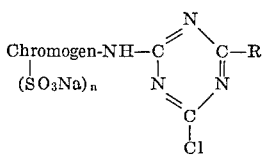

wherein $n$ is 2 or 3 and R is either $NH_2$, $NHC_6H_5$,

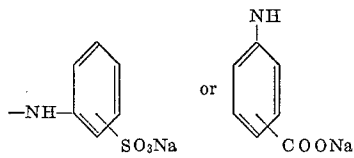

These dyestuffs react with fibers, and particularly cellulose fibers, through the chlorine atom of the cyanuric ring. It is necessary, however, that the above dyestuffs contain a number of solubilizing groups such as, for example, sulfo, and carboxy groups. These solubilizing groups allow removal, from the fiber, of that fraction of dye which instead of reacting with the fiber undergoes hydrolysis and dyes as a direct dyestuff. It is important to be able to remove the hydrolyzed portion of the dye in order to obtain high color fastness. It is the solubilizing groups, however, which also not only give the necessary solubility to the dyestuffs, but diminish their affinity or substantivity. Thus, for example, Italian Patent 579,849 points out that in the event R, in the above-identified formula, is an aromatic amine, it is necessary for the compound to contain also hydro-solubilizing groups such as $SO_3H$ and $COOH$.

It has been now discovered that particularly good results can be obtained by preparing reactive dyestuffs, derived from cyanuric chloride, which are incapable of losing part of their solubilizing groups either during or after the chemical reaction with the fiber. The dyes having this characteristic are represented by the general formula:

II.

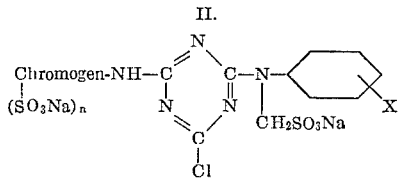

wherein X is hydrogen, $-CH_3$, $-OCH_3$ or $-OC_2H_5$; $n$ is 1, 2, 3 or 4 and the $-CH_2SO_3Na$ group is not easily removed by saponification. This may probably be explained by the fact that the contemporaneous presence of the negative radicals of the triazine and of benzene diminishes the electron density on the nitrogen atoms, thus stabilizing the bond between the group $-CH_2SO_3Na$ and the molecule of the dyestuff. These dyes have functional groups capable of reacting with the hydroxyl groups of cellulosic materials and with the $NH_2$ or NH groups of the natural and synthetic polyamides so as to form covalent bonds between the dye and the fiber. This reaction takes place during the dyeing process. It was found, quite unexpectedly, that the presence of a sulfo group on the aliphatic radical renders the dyestuffs highly water-soluble in comparison to those dyes illustrated by Formula I. The presence of the sulfo groups on the aliphatic radical allows removal from the fiber of that fraction of the dye which, instead of reacting with the fibers, undergoes hydrolysis. The improved solubility is evidenced by a paper chromatogram obtained with an aqueous diluent. Here it was noticed that the spots of the dyestuffs, as represented by Formula II, have an $R_f$ value (see E. Lederer Chromatographic en Chimie Organique et Biologique, vol. I, page 155 (1959)), higher than those exhibited by the dyestuffs represented by Formula I.

The advantages shown by the dyestuffs of the present invention are: higher solubility in dye baths and lower affinity with respect to the dyestuffs of the general Formula I.

Consequently, they are particularly suitable for dyeing by impregnating processes and for printing. Furthermore, after dyeing, the portion of the dyestuff which has not reacted with the fiber is easily and wholly removed, resulting in very good fastness toward wet treatments. It is also possible by the use of the dyestuffs of the present invention to prepare highly concentrated printing pastes which are stable for a long period of time, without fluctuation of quality or precipitation of the dyestuff.

At the same time, these dyestuffs have the advantage of deeper penetration into the fiber, thus giving more uniform dyeings.

The chromogen of the above formula may be selected from a number of classes of dyestuffs which may include, for example, the azoic dyestuffs, metallized-azoic dyestuffs, anthraquinone dyestuffs and the phthalocyanine derivatives. Each of these dyes exhibits outstanding dyeing characteristics and color fastness after an alkaline heat treatment. Of the anthraquinone dyestuffs, particularly good results were obtained with 1-amino-4-(4'-amino-3'-sulfoanilino)-2-anthraquinone-sulfonic acid. These dyestuffs may be used satisfactorily in both dyeing and printing processes and on a number of different materials such as, for example, natural or synthetic polyamides, wool, silk, superpolyamides, and especially those fibrous materials which contain hydroxyl groups such as cellulose, regenerated cellulose, flax, cotton, etc. The various forms of fibers which may be dyed include staple, yarns, and laminates. The use of these dyes for printing or dyeing on the above-mentioned materials may be carried out by any of the well known conventional processes.

When, for example, the dyeing process is to be carried out according to the exhaustive batch method, the concentration of the dye will vary depending upon which dye is being used, the desired intensity and the material being dyed. Generally, the concentrations range from about 0.1–6% by weight of the fiber. On the other hand, when the dyeing process is carried out in accordance with the continuous process, the solubility of the dyestuffs is a very important factor and must be considered together with the desired shade and material being dyed. For this process, the concentration of the dye in the foulard bath ranges from about 2 g./l. to 40–50 g./l.

The following examples illustrate the dyes and their method of preparation in accordance with this invention.

EXAMPLE 1

0.1 mol (18.44 g.) cyanuric chloride are dissolved in 100–150 ml. acetone and the solution is poured on water and ice (200–600 parts total). Onto the thus obtained cyanuric chloride suspension a neutral solution consisting of 0.1 mol (20.9 g.) $C_6H_5$ $NHCH_2SO_3Na$ in 100–130 ml. water, cooled at 2–4° C. with ice, is poured dropwise and under agitation, within 20–40 minutes.

During the addition, the temperature of the reaction mass is kept between 0 and 2° C. and the pH between 5 and 6 by suitable dropwise addition of acid acceptor solutions (20% $Na_2CO_3$ solution, 1 N NaOH solution, $NaHCO_3$ and optionally Na acetate).

At the end of the addition of the solution salt of the anilino methanesulfonic acid, the agitation is continued until the completion of the dissolution (about 2 hours), keeping the temperature of the reaction mass between 0 and 2° C. and the pH between 5 and 6.

After this period of time, the thus obtained solution is neutralized with 1 N NaOH or 10% $Na_2CO_3$ and, if necessary, it is separated from the insoluble residue.

The sodium salt of N-(4′,6′-dichloro-s-triazin-2′-yl)-anilinomethanesulfonic acid is thus obtained.

The same product may be obtained without using acetone, by working as follows:

19.1 g. cyanuric chloride (=0.103 mol), screened at 200 mesh/cm.$^2$ are suspended in 300 ml. water and ice containing traces of known soaking agents (e.g. Emulgator MK).

A solution containing 20.9 g. (0.1 mol) of the sodium salt of the anilino methanesulfonic acid in 100–130 ml. water, cooled at 2–4° C. with ice (pH about 7) is added within 20–30 minutes.

During and after the addition, the temperature is kept at 0–2° C. and the pH between 5 and 6 by suitable additions of diluted alkalines ($Na_2CO_3$, NaOH, $NaHCO_3$ or sodium acetate).

The reaction mixture is agitated for about 2 hours until the completion of the dissolution, then it is purified by removing the little amount of residue present (volume 450 ml). The solution of the condensation product of cyanuric chloride with the sodium salt of the anilino methanesulfonic acid obtained as above described, is added to a neutral solution of 0.077 mol in 700 ml. water of the product obtained by coupling in slightly acid medium the diazo of 2-amino-4,8-naphthalene disulfonic acid with 3-acetamino-aniline.

out with 20% by volume KCl and, after precipitation, is filtered and dried under vacuum at 40° C. The thus obtained dyestuff having the formula

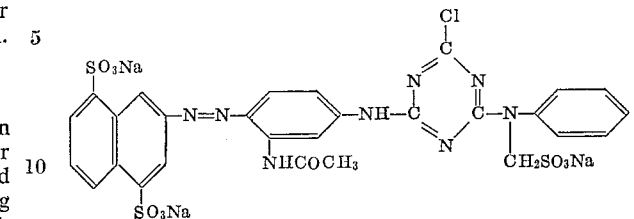

dyes cotton in a reddish-yellow shade having very good fastness in wet.

EXAMPLE 2

Example 1 was repeated except that a sodium salt of the m-toludino methanesulphonic acid was used in place of the sodium salt of anilino methanesulfonic acid. A dyestuff was obtained which dyed cotton yellow and exhibited good color fastness particularly after an alkaline treatment.

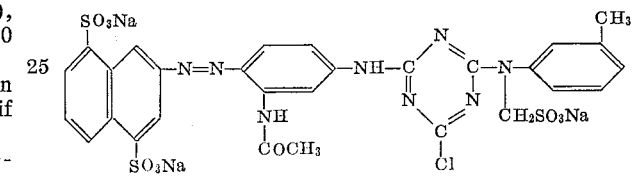

EXAMPLE 3

Approximately 19 parts (0.103 g. mol) of cyanuric chloride were suspended in 200 parts of ice and 150 parts of water. The suspension was agitated for 3 to 5 minutes while maintaining the temperature below 4° C. by the addition of ice. A solution having a pH of about 7 and containing 20.9 parts (0.1 g. mol) of a sodium salt of anilino methanesulfonic acid and 150 parts of water was added to the suspension over a period of 30 minutes. The pH of the mixture was adjusted between 5.5 and 6.0 by the gradual addition of 50 to 55 parts by volume of an aqueous 10% w./v. solution of sodium carbonate. The suspension was agitated for 2 hours at 0–3° C. and a solution having a pH of about 7 and containing 26.1 parts (0.1 g. mol) of a mono-sodium salt of isogamma acid in 400 parts of water was added to the suspension. The entire mixture was heated to about 40° C. and while holding the temperature constant the pH was adjusted to 5.5–6.0 by gradually adding 50–55 parts by volume of a 10% w./v. solution of sodium carbonate. After the mixture had been reacted for about 2 hours at about 40° C., the solution was cooled to 2–3° C. and a diazo consisting of 23 parts (0.1 g. mol) of 4-amino-acetanilide-3-sulfonic acid was added to the mixture.

The solution is heated at 35–40° C. and this temperature is kept constant for 4–10 hours, by keeping the pH at 6–6.5 by dropwise addition of 10% $Na_2CO_3$.

The end of the condensation is made evident by the disappearance of the diazotizable amino groups or by chromatographic analysis on paper. The whole is salted

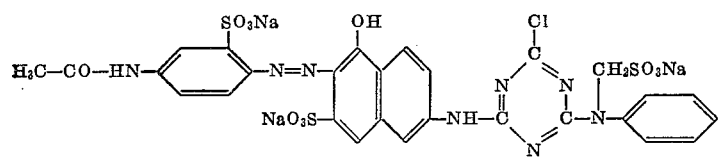

The dye was precipitated by salting-out and filtered under a vacuum. The product was then dried at a temperature of about 35–40° C. for 48 hours. Upon adding this dye to water a scarlet-red solution was obtained which dyed cotton to a scarlet shade. The dye exhibited good color fastness after an alkaline treatment.

EXAMPLE 4

Example 3 was repeated except that the sodium salt of anilino methanesulfonic acid was replaced with the sodium salt of m-toluidino methanesulfonic acid. A dyestuff was obtained which when dissolved in water yielded a red-scarlet solution which dyed cotton a scarlet shade. The dye exhibited good color fastness after an alkaline treatment.

EXAMPLE 5

Approximately 19 parts (0.103 g. mol) of cyanuric chloride were suspended in 200 parts of ice and 150 parts of water. A solution having a pH of about 7 and containing 29.9 parts (0.1 g. mol) of a solution salt of anilino methanesulfonic acid and 150 parts by weight of water was added over a period of 30 minutes to the suspension with agitation at a temperature below 4° C. The pH of the solution was maintained between 5.5–6.0 by the addition of 50–55 parts by volume of an aqueous 10% solution of sodium carbonate. After agitating for about 2 hours at 0–3° C., a solution having a pH of about 7 and containing 18.8 parts of 3-amino-4-sulfoaniline and 150 parts of water was added. The mixture was heated to about 40° C. and held at this temperature while the pH was continuously adjusted to 5.5–6.0 by the gradual addition of 50–55 parts by volume of a 10% w./v. $Na_2CO_3$ solution. After agitation for 2 hours at 40° C., the solution was cooled to 2–3° C. and 6.9 parts (0.1 g. mol) of sodium nitrite (as a 20% w./v. aqueous solution), 80 parts of ice and 25.7 parts of 21° BeHCl was added in the form of a thin stream. After about 10 minutes of agitation at 3–4° C., a solution of the diazo was added over a period of 15 minutes to the mixture which had previously been cooled to about 5° C. The diazo consists of 32.3 parts (0.1 g. mol) of 1-(2',5'-dichloro-4'-sulfophenyl)-3-methyl-5-pyrazolone in 150 parts of water and 13 parts of $Na_2CO_3$. The solution was added just before the coupling with 60 parts of crystallized sodium acetate. The dyestuff was precipitated by salting-out and filtered under a vacuum. The product was dried at a temperature of about 35–40° C. for 48 hours. The dyestuff was dissolved in water forming a lemon-yellow solution which was used to dye cotton to a yellow shade which exhibited good color fastness after an alkaline treatment.

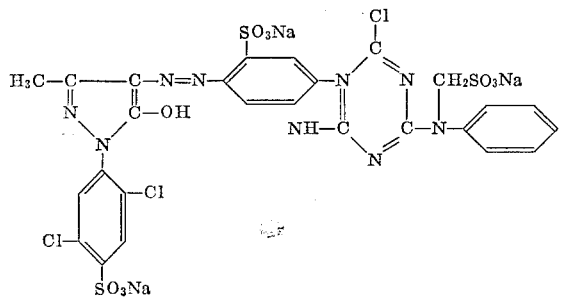

EXAMPLE 6

Example 5 was repeated except that the sodium salt of anilino methanesulfonic acid was replaced with a sodium salt of m-toluidino methanesulfonic acid. A dyestuff was obtained which dissolved in water to give a lemon-yellow color. This solution was used to dye cotton yellow which exhibited good color fastness after an alkaline treatment.

EXAMPLE 7

The condensation product of Example 5 was repeated with a modification. In place of the 1-(2',5'-dichloro-4'-sulfophenyl)-3-methyl-5-pyrazolone, a solution consisting of 42.3 parts (0.1 g. mol) of N-benzoyl-H acid in 300 parts of water and 60 parts of sodium carbonate was used as the coupling agent. The dye was precipitated by salting-out and filtered under a vacuum. The product was dried at a temperature of about 35–40° C. for 48 hours. The dyestuff was dissolved in water forming a red-bluish solution which dyed cotton red. The dye exhibited good color fastness after an alkaline treatment.

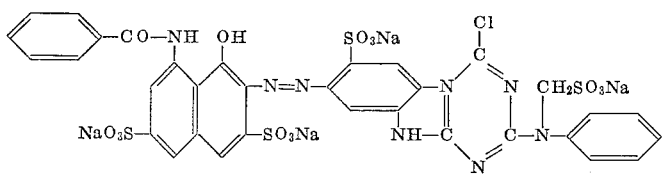

EXAMPLE 8

The condensation product of Example 6 was prepared in accordance with the process step of Example 7. The dyestuff obtained was dissolved in water forming a bluish-red solution which dyed cotton red. The dye exhibited good color fastness after an alkaline treatment.

EXAMPLE 9

A condensation product was prepared in accordance with the method of Example 5 but with the use of a coupling agent which consisted of a solution having 28.2 parts (0.1 g. mol) of N-carbamyl-isogamma acid in 300 parts of water and 4 parts of sodium hydroxide (NaOH). Approximately 55 parts of $Na_2CO_3$ was used as a buffering agent. The dyestuff was precipitated by salting-out, filtered under a vacuum, and dried at a temperature of 35–40° C. for 48 hours. The dye was dissolved in water forming a reddish-orange solution. This solution was used to dye cotton to an orange shade which exhibited good color fastness after an alkaline treatment.

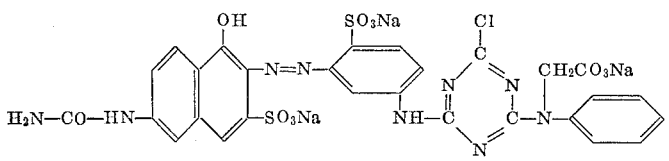

EXAMPLE 10

A condensation product was prepared in accordance with Example 6 following the process described in Example 9. The dyestuff obtained was dissolved in water to form a reddish-orange solution. This solution was used to dye cotton to an orange shade which exhibited good color fastness after an alkaline treatment.

EXAMPLE 11

0.1 mol (18.44 parts) of cyanuric chloride are dissolved in 100–150 parts acetone and the solution is poured on water and ice (total 200–600 parts).

The neutral solution of 0.1 mol (29.3 parts) of the sodium salt of the o-anisidino methanesulfonic acid in 250 parts of water, cooled at 2–4° C. with ice is poured dropwise and within 20–40 minutes on the cyanuric chloride suspension obtained as above.

During the addition the temperature of the reaction mass is maintained between 0 and 2° C. and the pH between 5 and 6, by suitable addition dropwise of acid fixing solutions (20% Na₂CO₃, 1 N NaOH, NaHCO₃, optionally sodium acetate).

At the end of the addition of the sodium salt of the o-anisidino methanesulfonic acid, the agitation is continued till the solution is completed (about 2 hours) always keeping the temperature of the reaction mass between 0 and 2° C. and the pH between 5 and 6.

After this period of time the obtained solution is neutralized with 1 N NaOH or 10% Na₂CO₃ and if necessary the insoluble residue present is removed.

Thus the monocondensate, the sodium salt of N-(4',6'-dichloro-s-triazin-2-yl-o-anisidino methanesulfonic acid is obtained.

To the solution thus obtained 0.077 mol (50 parts) of the trisodium salt of the monoazo

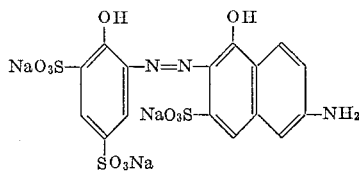

(prepared by coupling in carbonate medium the diazo of the 2-amino-phenol-4,6-disulfonic acid with isogamma acid, metallizing with 1 equivalent of CuSO₄ at 60°–65° C. at pH 5–5.6, in the presence of acetic acid-sodium acetate and then separating the copper metallized product by salting out) successively dissolved to neutral in 400 parts wathe is added.

The whole is heated at about 40° C. and this temperature is maintained till the pH of the solution, by gradual addition of diluted alkali (e.g. 10% Na₂CO₃ solution) is stabilized at a value of about 6–6.5 and the aromatic amino group is not yet detectable.

After salting out, the dyestuff is filtered under vacuum and is allowed to dry as much as possible; then is dried in a stove at about 35–40 C., for 24–30 hours.

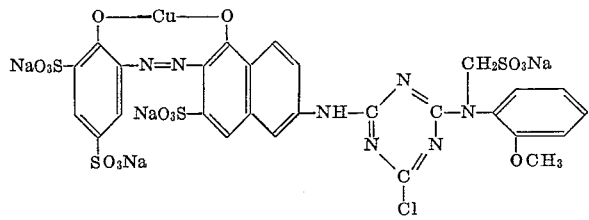

The dyestuff thus obtained dissolves in water thus giving a ruby solution which dyes cotton in a ruby red shade, having very good fastness after an alkaline treatment.

EXAMPLE 12

The solution of the product obtained by condensing cyanuric chloride and the sodium salt of o-anisidino methanesulfonic acid is added with 0.077 mol of the dyestuff obtained from 2-amino-naphthalene-6,8-disulfonic acid which has been diazotized and coupled in alkaline medium with 2-amino-5-naphthol-7-sulfonic acid and then solubilized until neutral in 400 ml. water.

The solution is heated at about 40° C. and this temperature is kept constant till the pH of the solution, by addition of diluted alkaline (e.g. 10% Na₂CO₃) is adjusted at 6–6.5 and the aromatic amino group cannot be detected. After salting, the dyestuff is filtered under vacuum and is dried as much as possible and then dried in a stove at 35–40° C. for 24–30 hours. The thus obtained dyestuff dissolves in water and gives a scarlet solution; it dyes cotton in scarlet with good fastness after alkaline treatment.

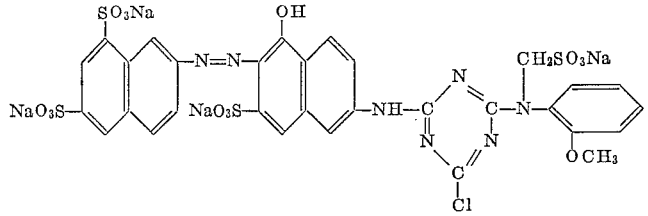

EXAMPLE 13

By working as in the preceding example, but using the sodium salt of p-anisidino methanesulfonic acid instead of the sodium salt of o-anisidino methanesulfonic acid, a dyestuff is obtained which dyes cotton to a scarlet shade with good color fastness after alkaline treatment.

EXAMPLE 14

By working as in Example 12, but using the sodium salt of o- or p-phenetidino methanesulfonic acid, dyestuffs are obtained which dye cotton to a scarlet shade with good color fastness after alkaline treatment.

EXAMPLE 15

The solution of the condensation product between cyanuric chloride and the sodium salt of the o-anisidino methanesulfonic acid is added, within 1–2 minutes, at about 20° C. and under agitation, with the neutral solution of 18.5 g. of the sodium salt of the 2,4-diaminobenzene sulfonic acid in 120–200 ml. water.

The pH is then adjusted at 5–6 and is kept at this value by addition of a 20% Na₂CO₃ solution; the whole is heated at 35–40° C. on a water-bath within 1 hour and this temperature is kept constant for another hour to complete the reaction.

The reaction solution is cooled at room temperature and then is added with 6.9 g. NaNO₂.

It is then indirectly diazotized by quick pouring on ice (300 g.) and 20° Bé hydrochloric acid (28 ml.).

The whole is agitated for 10–15 minutes at 0–2° C. A yellow suspension is obtained.

The nitrous acid in excess is removed by using sulphonic acid.

The suspension of the diazo is added within 15 minutes to the solution of the coupling agent obtained by dissolving 33.1 g. (=0.103 mol) of the 1 - (2',5'-dichloro-4-sulfo-phenyl) - 3 - methylpyrazolone in 150 ml. water containing 13 g. Na₂CO₃; the thus obtained solution is cooled at 2–3° C. and added immediately before the coupling reaction with 50 g. of crystallized sodium acetate.

After the coupling, the dyestuff

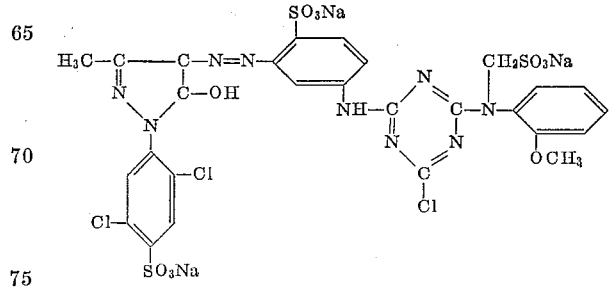

is precipitated by salting out with 25% (w./v.) NaCl and allowed to stand for one night.

The dyestuff is filtered and dried at 40° C. After milling a yellow-powder is obtained; it dyes in yellow-greenish shades having very good dyeing characteristics and fastness.

EXAMPLE 16

By working as described in the preceding example, but replacing the sodium salt of o-anisidino methanesulfonic acid by the sodium salts of the o- and p-phenetidino methanesulfonic acids, dyestuffs are obtained having characteristics similar to those of Example 14.

EXAMPLE 17

The process of Example 11 was repeated except that a sodium salt of p-ansidino methanesulfonic acid was used in place of the sodium salt of o-anisidino methanesulfonic acid. A product was obtained which dyes cotton in rubine shade which exhibited good color fastness after an alkaline heat treatment.

EXAMPLE 18

The process steps of Example 11 were repeated except that a sodium salt of o- or p-phenetidino methanesulfonic acid was used. The product obtained dyed cotton a rubine shade which exhibited good color fastness after an alkaline treatment.

EXAMPLE 19

18.9 g. (0.1 mol) of the 2 - aminophenol-4-sulfonic acid are directly diazotized in suspension and at 0–5° C.

The solution of the diazo (volume 250 ml.) after neutralization with Na₂CO₃ using Congo red, is coupled with isogamma acid (25.1 g.=0.105 mol) at pH 9–9.5 and at 0–5° C.

The solution of the thus obtained monoazo product (volume 500 ml.) is heated at 60° C. and is added with the solutions consisting of 1 equivalent of CuSO₄·5H₂O (25 g.) and 2 equivalents crystallized sodium acetate.

The metallization is completed within 1–2 hours at 60–65° C. and at pH of about 6.

The Cu complex is isolated by filtration after cooling and salting at 10% (w./v.).

The cake of the metallized monoazo compound is dissolved in 500 ml. water at a pH 7–75; to this mixture the solution of 0.13 mol of the condensation product between cyanuric chloride and the sodium salt of the anilino methanesulfonic acid prepared according to Example 1 is added at room temperature. The resulting solution is added with 14 g. (=0.1 mol) of crystallized sodium acetate, heated on a water-bath at 40–45° C. and is maintained for 2–4 hours at this temperature until the reaction is completed.

The pH is kept at 5.8–6.0 by addition of alkalies (Na₂CO₃, NaHCO₃, etc.: volume about 100 ml.).

The dyestuff having the formula

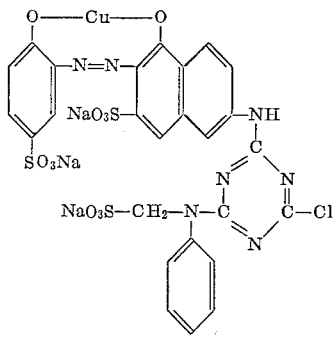

is isolated by filtration after cooling at room temperature, salting at 15% (w./v.) and after being allowed to stand for one night. The dyestuff is dried at 40° C. A brown-violet powder is obtained after milling; it dyes cotton in red-bluish (rubine) shades having very good dyeing characteristics and fastness in wet.

EXAMPLE 20

By using the sodium salt of the m-toluidino methanesulfonic acid instead of sodium salt of the anilino methanesulfonic acid a dyestuff having characteristics similar to those of the dyestuff of the preceding example is obtained.

EXAMPLE 21

0.1 mol of the intermediate having the following structure:

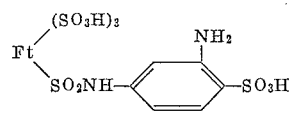

(wherein Ft means the radical of the Cu phthalocyanine) are added under agitation, in the form of a paste, to 2000 ml. water and the pH is adjusted at 8 by addition of little amounts of NaOH.

The thus obtained solution is slowly added, at 0–5° C., to the solution, kept at 0–5° C. of the condensation product between 0.1 mol of the cyanuric chloride and 0.1 mol of the sodium salt of the aniline-N-omega-methanesulphonic acid added with 10 g. Na₂CO₃.

The condensation product between cyanuric chloride and the sodium salt of the anilino methanesulfonic acid can be prepared for instance by dissolving 0.1 mol of the sodium salt of anilino methanesulfonic acid in 500 ml. water and adding 17 g. of NaHCO₃ and successively, at a temperature of 0–5° C., a suspension (kept at 0–5° C.) of 0.1 mol of cyanuric chloride in 1500 ml. water.

The mass is agitated for some hours at a temperature increasing up to 20–25° C. till the reaction is completed.

The reaction product is separated by salting out. The thus obtained dyestuff dyes cotton in a blue-turquoise shade showing very good fastness to washing.

EXAMPLE 22

By working as described in the preceding example, but using the intermediate having the following composition:

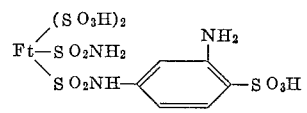

a dyestuff is obtained which dyes to a turquoise shade less yellowish than that of the dyestuff obtained according to Example 21.

EXAMPLE 23

By working as described in Example 21, but using the intermediate having the following composition

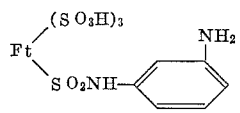

a dyestuff is obtained which dyes the cellulose fibers in a turquoise shade showing very good fastness in wet.

EXAMPLE 24

By working as in the Example 21, but using the intermediate having the following composition

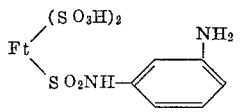

a dyestuff is obtained having characteristics analogous to those of the dyestuff of Example 23.

EXAMPLE 25

By working as in Example 21, but using the sodium salt of the m- or p-toluidino methanesulfonic acid, instead of the sodium salt of the anilino methanesulfonic acid, dyestuffs are obtained having characteristics analogous to those of the dyestuff obtained according to Example 1.

EXAMPLE 26

By working as in Example 21, but using an equimolar amount of the sodium salt of the o-anisidino methanesulfonic acid instead of the sodium salt of the anilino methanesulfonic acid, a dyestuff is obtained which dyes cotton in a turquoise shade having very good fastness in wet.

EXAMPLE 27

0.1 mol of the 1-amino-4-(4'-amino-3'-sulfoanilino-2-anthraquinonesulfonic acid are salified in 1500 ml. water by addition of sodium carbonate.

The mass is then slowly added, at 0–5° C., into a pure solution, this also kept at 0–5° C., of the compound obtained according to what has been described in Example 1 by condensation between 0.1 mol of cyanuric chloride and 0.1 mol of the sodium salt of the anilino methanesulfonic acid added with 10 g. of NaHCO₃. The temperature is allowed to rise slowly up to 20–25° C. and is maintained till the condensation is completed.

A dyestuff having the following composition

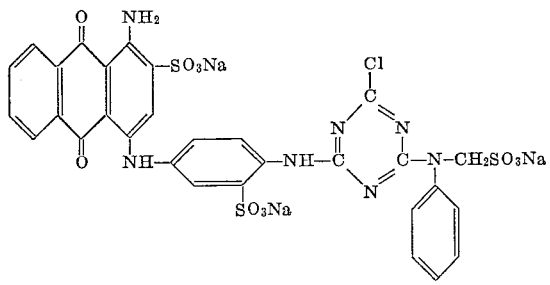

is separated by salting. It dyes the cellulose fibers to a blue shade having good fastness in wet.

EXAMPLE 28

By working as in Example 27, but using as the intermediate the 1-amino-4-(4'-aminoanilino)-2-anthraquinonesulfonic acid a dyestuff is obtained having the following composition:

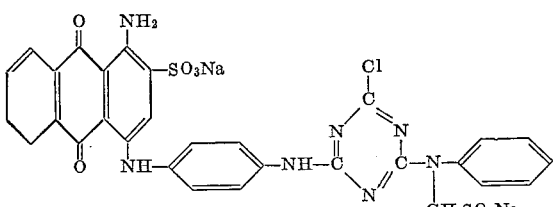

It dyes the cellulose fibers to a blue shade having good fastness.

EXAMPLE 29

By working as in Example 27 but using as intermediate the 1-amino-4-(3'-aminoanilino)-2-anthraquinonesulfonic acid a dyestuff is obtained having the following composition

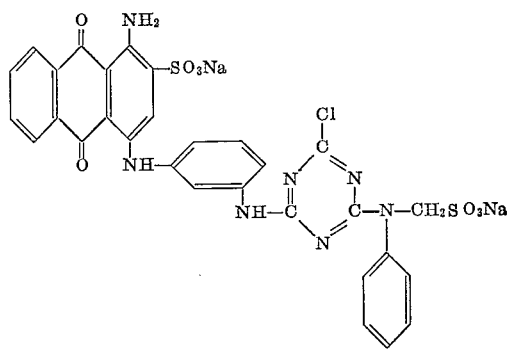

It dyes in a shade more reddish than those of the dyestuffs obtained according to Example 28.

By working as described above but using the sodium salt of the m- or p-toluidino methanesulfonic acid, dyestuffs having analogous characteristics are obtained.

EXAMPLE 30

By working as described in any one of the examples from 27 to 29, but using an equimolar amount of the sodium salt of the o-anisidino methanesulfonic acid instead of the sodium salt of the anilino methanesulfonic acid, dyestuffs are obtained which dye cotton in a blue shade having a very good wet fastness.

When the Examples from 27 to 29 are carried out using equimolar amounts of the sodium salts of the o- and p-phenetidino methanesulfonic acids instead of the sodium salt of the o-anisidino methanesulfonic acid, reactive dyestuffs are obtained having analogous characteristics.

EXAMPLE 31

By working as in Example 27, but using the sodium salt of m- or p-toluidino methanesulfonic acid, reactive dyestuffs are obtained having analogous characteristics.

EXAMPLE 32

Approximately 2 parts of the dyestuff prepared according to Example 19 were dissolved in 2,000 parts of distilled water at a temperature of 50–55° C. Approximately 100 parts of cotton in the form of skeins were immersed in the dye bath with agitation. After about 20 minutes, at a temperature of about 60° C., about 80 parts of anhydrous sodium sulfate were added to the bath. After about 20 minutes with the temperature being about 70° C., an additional 120 parts of anhydrous Na₂SO₄ were added to the bath. The temperature of the bath was brought to about 80° C. in about 10 minutes and held for a total period of about 20 minutes, while approximately 300 parts of a 10% solution of Na₂CO₃ were added twice over to the bath. The dyeing operation was continued at a temperature ranging from about 80–85° C. for a period of 1 hour. The dyed skeins were then taken from the bath, rinsed in cold water and saponified for 30 minutes at the boiling temperature with a 3% solution of Marseille soap at a bath ratio of about 1:50. The cotton appeared ruby-red, which was shown to have a good color fastness particularly to wet.

EXAMPLE 33

Approximately 2 parts of the dyestuff prepared in accordance with Example 27 were mixed with 2 parts of Na₂CO₃ and 20 parts of urea. This mixture was dissolved in 80 parts of water. A cotton fabric was impregnated with the dyeing solution and squeezed in such a manner that the increase in weight by the fabric was about 75%. Subsequently, the fabric was dried to a residual moisture content of 15%. The fabric was then heat-treated with dry heat for 5 minutes at a temperature ranging from about 140 to about 160° C. The fabric was then rinsed first with cold water and then with hot water and was saponified for 15–20 minutes in a 3% solution of a non-ionic surfactant. The rinsing and drying steps were repeated and a fabric was obtained which had a brilliant blue shade exhibiting good color fastness.

EXAMPLE 34

Approximately 2 parts of NaHCO$_3$, 3 parts of urea, and 2 parts of the dyestuff obtained from Example 21 were dissolved in 90 parts of water at room temperature. A cotton fabric was impregnated with the solution of the dye and then squeezed in such a manner that the increase in weight by the fabric was about 75%. Subsequently, the fabric was dried to a point where the weight due to the dye solution was only 10–15% as regards its weight. The fabric was vaporized for 5–8 minutes at 100° C. under saturated steam and then rinsed and saponified in the same manner as the preceding examples. The cotton fabric appeared as a brilliant blue-turquoise shade exhibiting generally good color fastness.

EXAMPLE 35

Approximately 2 parts of the dyestuff obtained from the process of Example 21 were dissolved in 100 parts of water. A cotton fabric was then impregnated with a solution of the dye and squeezed in such a manner that the increase in weight by the fabric was about 75%. The fabric was treated for 10 minutes at 75° C. in a bath containing 5–10 g./l. of trisodium phosphate, 1 ml./l. of 36° Bé. NaOH and 200 g./l. NaCl. The treated fabric was rinsed with cold water, then with hot and finally dried. The dyed fabric appeared as a brilliant turquoise shade having a good color fastness.

While this invention has been described with respect to a number of specific embodiments, it is obvious that many other variations and modifications may be resorted to without departing from the spirit of this invention except as more specifically pointed out in the appended claims.

What is claimed is:

1. A fabric selected from the group consisting of cellulose materials and polyamide materials containing an effective amount of a reactive dye characterized by the formula:

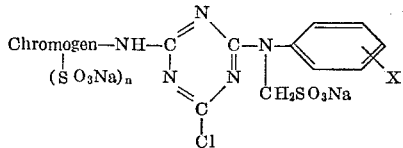

wherein $n$ ranges from 1 to 4 and X is selected from the group consisting of H, —CH$_3$, —OCH$_3$, and —OC$_2$H$_5$.

2. The process of dyeing fabrics selected from the group consisting of cellulose and polyamide materials which comprises contacting said materials with an effective amount of a reactive dye; said dye being characterized by the formula:

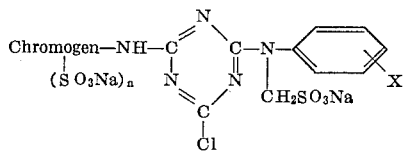

wherein $n$ ranges from 1 to 4 and X is selected from the group consisting of H, —CH$_3$, —OCH$_3$, and —OC$_2$H$_5$.

References Cited

UNITED STATES PATENTS 3,022,304   2/1962   Staeuble et al.
3,325,242   6/1967   Bosshard et al. _____ 8—54

NORMAN G. TORCHIN, *Primary Examiner.*

T. J. HERBERT, *Assistant Examiner.*